United States Patent
Al-Nabulsi

[19]

[11] Patent Number: 5,954,976
[45] Date of Patent: Sep. 21, 1999

[54] METHOD AND APPARATUS FOR AUTOMATICALLY ADJUSTING AIR PRESSURE IN A PNEUMATIC WELD HEAD

[75] Inventor: Talal M. Al-Nabulsi, Chicago, Ill.

[73] Assignee: Unitek Miyachi Corporation, Monrovia, Calif.

[21] Appl. No.: 08/874,386

[22] Filed: Jun. 13, 1997

[51] Int. Cl.⁶ .............................. B23K 3/00; B23K 11/24
[52] U.S. Cl. ................... 219/110; 219/85.19; 219/86.51; 219/89; 219/91.1
[58] Field of Search ................................ 219/86.51, 110, 219/86.22, 86.41, 86.61, 89, 91.1, 85.19

[56] References Cited

U.S. PATENT DOCUMENTS

| | | | |
|---|---|---|---|
| 2,472,368 | 6/1949 | Cox et al. ............................. | 219/86.51 |
| 3,553,420 | 1/1971 | Shearer, Jr. et al. .................... | 219/110 |
| 3,727,822 | 4/1973 | Umbaugh ............................... | 219/110 |
| 3,925,635 | 12/1975 | Schneider ............................. | 219/89 |
| 4,317,980 | 3/1982 | Goodrich et al. ....................... | 219/110 |
| 4,733,042 | 3/1988 | Nishiwaki et al. ...................... | 219/89 |
| 5,360,958 | 11/1994 | Bogue et al. .......................... | 219/86.51 |

*Primary Examiner*—Clifford C. Shaw
*Attorney, Agent, or Firm*—Christie, Parker & Hale, LLP

[57] ABSTRACT

A pressure regulator system for a pneumatically- or hydraulically-actuated weld head. The weld head includes a switching valve comprising several ports: an inflow port attached to a source of pressurized gas, preferably air; an exhaust port; a first line port; and a second line port. Two-way valves are provided on the first line port and the second line port. A valve sensor connected to a switch for determining weld force in the weld head is connected to means for simultaneously closing the first line port valve and the second line valve port when a desired weld force is attained between one or more electrodes and a workpiece, thereby maintaining a constant, maximum pressure in the cylinder and consequently maintaining the desired weld force between the electrode(s) and the workpiece during the welding operation.

48 Claims, 9 Drawing Sheets

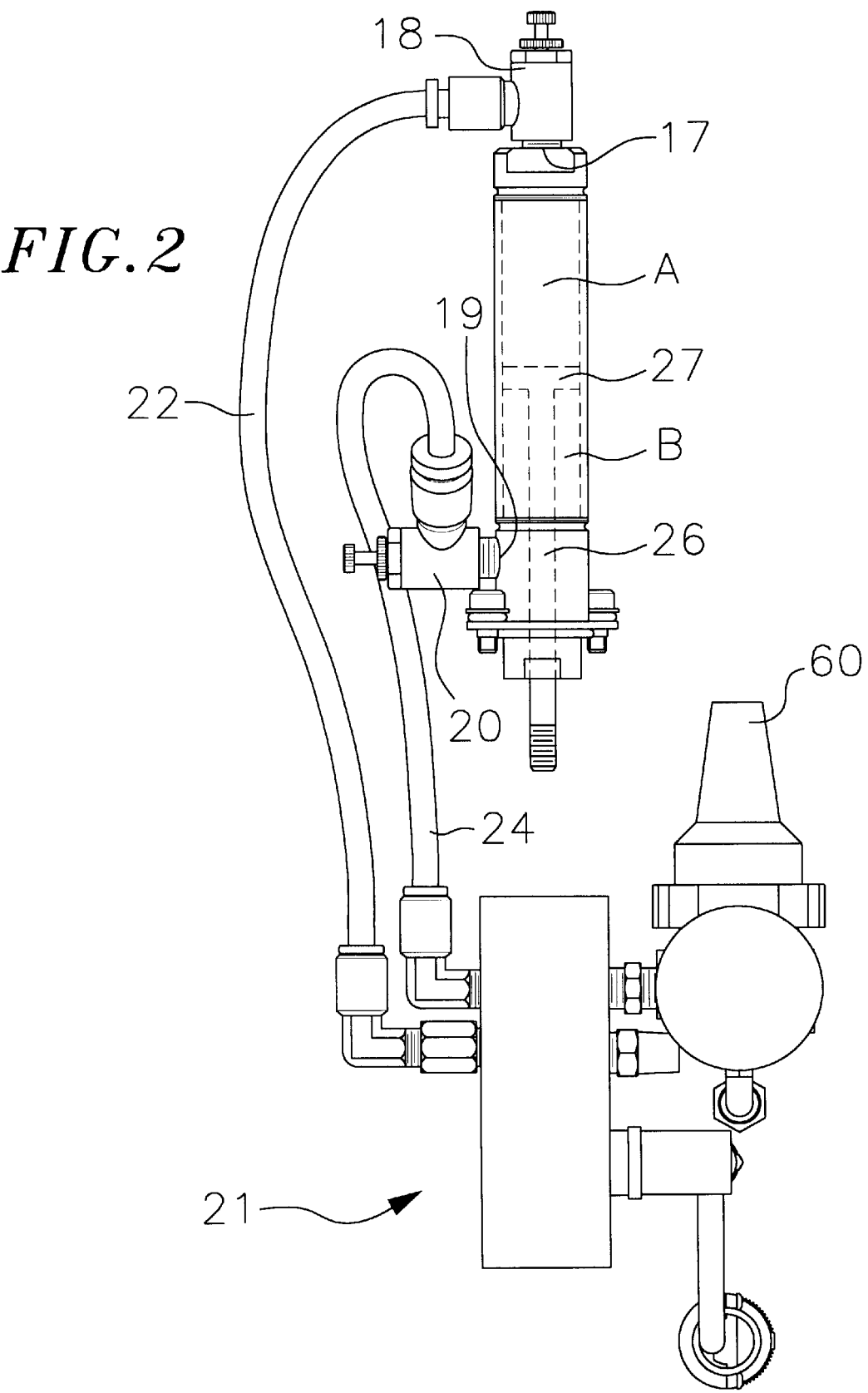

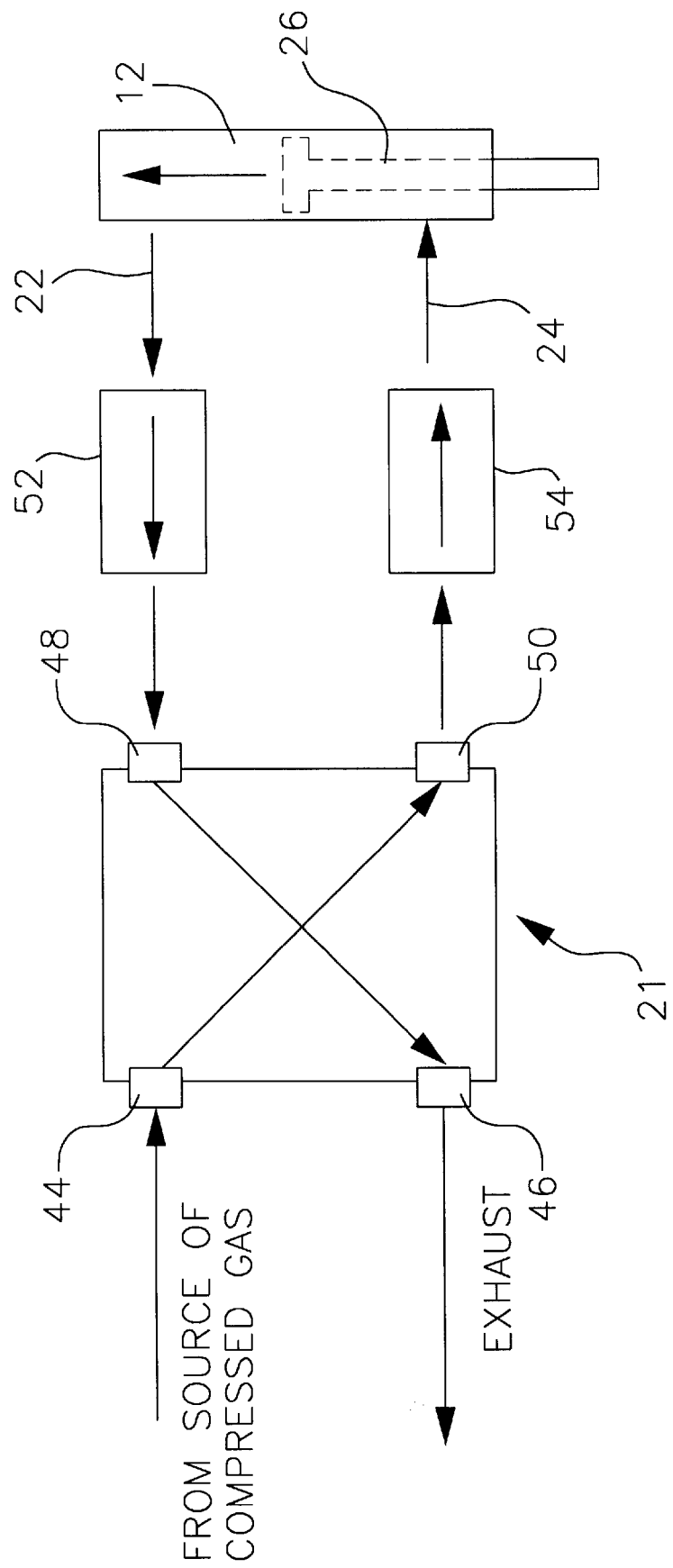

5,954,976

METHOD AND APPARATUS FOR AUTOMATICALLY ADJUSTING AIR PRESSURE IN A PNEUMATIC WELD HEAD

BACKGROUND OF THE INVENTION

This invention relates to pneumatically actuated resistance weld heads and reflow solder heads. More particularly, the invention relates to weld and reflow solder heads having an automatic cutoff of pressurized gas in a pneumatic cylinder when a desired weld force between an electrode and workpiece is attained.

For convenience, hereinafter the terms "weld" and "welding" shall refer to both resistance welding and reflow soldering systems and operations.

Air-actuated weld heads typically include an air cylinder which controls the upward and downward motion of one or more electrodes used to weld or reflow solder a workpiece. Such weld heads are adjustable and may be adapted for welding different types of workpieces.

Typically, different welding applications require different welding parameters. These parameters include the duration and magnitude of electrical weld energy, and the weld force, which is the force exerted on the workpiece by the electrode.

Typically, in known air-actuated weld heads, a maximum air pressure in the air cylinder is set separately from the weld force, which is usually set by precompressing a spring in the weld head connected between the air cylinder and the electrode. One problem associated with this manner of setting up the weld head for a new welding application is that, if set incorrectly, the air cylinder may continue to exert pressure on the electrode after the desired weld force has been attained resulting in excessive weld force.

In most weld heads, a force firing switch is operatively connected to the spring for sensing when the desired weld force is reached; that is, when the force applied by the air cylinder overcomes the precompression spring force. When the force firing switch activates in response to a desired weld force, it signals a microcontroller in a welding power supply to supply electrical current to the electrode(s) to initiate welding. The air cylinder is preset by manually setting pressure regulators on the air cylinder to a maximum pressure at which the force firing switch just activates. This is usually determined by first presetting the spring to the desired weld force and then performing a "dry run" with the air cylinder set to a pressure judged to be slightly above the target maximum pressure in the air cylinder corresponding to the desired weld force. During the dry run, the operator must first observe actuation of the force firing switch, note the pressure in the air cylinder, and then set the air cylinder pressure regulator for precisely that pressure. This procedure must be repeated any time a welding application requires a different weld force.

Such manual operation invites human error. This may occur in the form of an inaccurate initial setting, or by the operator forgetting to reset the air pressure in the cylinder for a new welding application. Such inaccurate settings can result in either an excessive or inadequate weld force, resulting in damaged welds or insufficient pressure to activate the force firing switch.

Furthermore, pressure settings in the air cylinder valves may drift, requiring subsequent adjustments to maintain the desired weld force. Such valve drift may go unnoticed through several welding operations, increasing the potential for unsatisfactory welds. Also, such continual adjustment increases the potential for human error.

SUMMARY OF THE INVENTION

A weld head or reflow solder head according to one embodiment of the invention includes an electrode controlled by a pneumatic cylinder, the pneumatic cylinder operating to force the electrode onto the workpiece and to retract the electrode off from the workpiece. For convenience, hereinafter the terms "weld" and "welding" shall refer to both welding and reflow soldering systems and operations. The pneumatic cylinder includes a first gas line and a second gas line. When pressing the electrode onto the workpiece, the first gas line supplies pressurized gas, preferably air, to the pneumatic cylinder and the second line exhausts the pressurized gas from the pneumatic cylinder. The weld head also includes a switch, having an on state and an off state, which is switched on when the electrode presses onto the workpiece with a desired weld force and means for simultaneously supplying electrical energy to the electrode for welding when the switch is on. The weld head also includes means for sealing the first gas line and the second gas line when the switch is on, thereby maintaining a desired pressure in the pneumatic cylinder.

In an alternate embodiment, the weld head includes a hydraulic cylinder instead of a pneumatic cylinder. The hydraulic system of the alternate embodiment operates in a manner analogous to that of the above described pneumatic system as the same principles of fluid dynamic apply.

One embodiment of a pressure regulator system according the present invention comprises a switching valve. The switching valve includes four ports: an inflow port; an exhaust port; a first gas line port; and a second gas line port. Attached to each of the gas line ports is a two-way valve. The pressure regulator system includes a valve sensor for determining an activated state of a weld force sensor incorporated in the weld head. The pressure regulator system also includes means for substantially simultaneously closing and sealing the two-way valves on the first gas line port and the second gas line port when the sensor determines an activated state of the weld force sensor.

According to another embodiment of the invention, a weld force in a pneumatically actuated welding system is controlled by performing the following steps which include moving an electrode onto a workpiece with a pneumatic cylinder and forcing the electrode onto the workpiece. Once a desired weld force is sensed between the electrode and the workpiece, the air supplied to and exhausted from the pneumatic cylinder is blocked. In this manner, the desired pressure in the pneumatic cylinder corresponding to the desired weld force is maintained in the cylinder during the welding operation.

By automatically cutting off the gas flow to the pneumatic cylinder when the desired weld force is attained in each welding operation, the above described embodiments of the invention provide several advantages over known weld heads. These advantages include eliminating human error due to inaccurate presetting of the maximum gas pressure in the pneumatic cylinder and automatic drift of the valve settings on the pneumatic cylinder, thereby improving the repeatability of the welding operation.

DESCRIPTION OF THE DRAWINGS

The foregoing features and advantages of the invention will be better understood by referring to the following drawings:

FIG. 2 is a partially cut-away elevational view of an air cylinder and a switching valve of the embodiment shown in FIG. 1;

FIG. 4 is a schematic diagram illustrating the flow of pressurized air to the air cylinder during an upstroke of an air cylinder actuating rod;

DETAILED DESCRIPTION OF THE INVENTION

Figure 1:
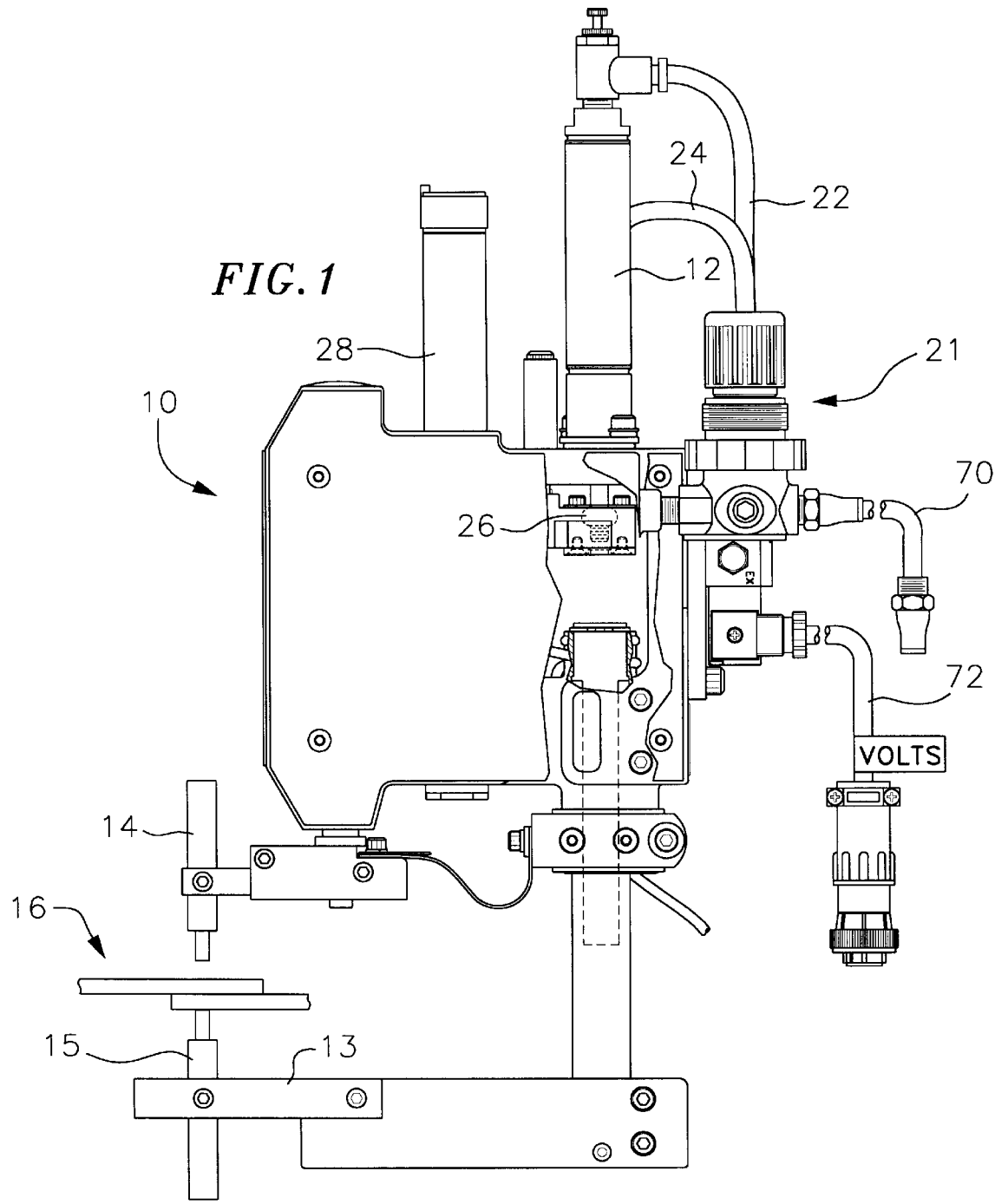
FIG. 1 is a partially cut-away elevational view of a preferred embodiment of a weld head according to the present invention.

Referring to FIG. 1, an air-actuated resistance weld head 10 (or reflow solder head) according to one embodiment of the invention includes an air cylinder 12 which indirectly exerts force on an electrode 14, thereby controlling movement of the electrode and the force of the electrode on a workpiece 16. The workpiece 16 may be welded or reflow soldered on both sides between the electrode 14 and a stationary base electrode 14 on a base 13 of the weld head unit, or only on a top surface of the workpiece 16 with the electrode 14 alone. The weld head or reflow solder head 10 is connected to an air compressor (not shown) by gas line 70 and to a valve power supply 80 (see FIG. 6) by power line 72.

For convenience, hereinafter the terms "weld" and "welding" shall refer to both resistance welding and reflow soldering systems and operations.

The air cylinder 12, shown more clearly in FIG. 2, includes two ports, a down port 17 and an up port 19. A movable piston rod 26 (hereinafter referred to as the "actuating rod") includes a piston head 27 in sealing contact with the inner walls of the air cylinder 12 which forms two air chambers in the cylinder, an upper chamber A above the piston head 27 and a lower chamber B below the piston head 27. A pressure differential between the two air chambers A, B causes the actuating rod 26 to move in the air cylinder 12.

To move the actuating rod 26, the operator controls pressurized air in through one port of the air cylinder 12 and exhausts air through the other port. An up speed flow control valve 18 is attached to the down port 17 and a down speed flow control valve 20 is attached to the up port 19. The flow control valves 18, 20 permit a free flow of pressurized air when inputting air into the air cylinder 12 and restrict air flow to a pre-set degree when exhausting air from the air cylinder. Thus, as the actuating rod 26 moves in the air cylinder 12, the flow control valve exhausting air controls the rate of movement of the rod. Thus, the up speed flow control valve 18 controls the rate at which the actuating rod 26 moves up in the air cylinder and the down speed flow control valve 20 controls the rate at which the actuating rod 26 descends.

Pressurized air from the air compressor is supplied to the air cylinder 12 through a switching valve 21, preferably a 24 volt four-way solenoid valve, which is connected to the down port 18 on the air cylinder via a down air line 22 and the up port 20 by a up air line 24. The switching valve 21 includes a pressure regulator 60 (fixed or adjustable) which is set to control the maximum air pressure in the cylinder in both the down air line 22 and the up air line 24 and hence, the maximum force exerted on the actuating rod 26.

Figure 3A:
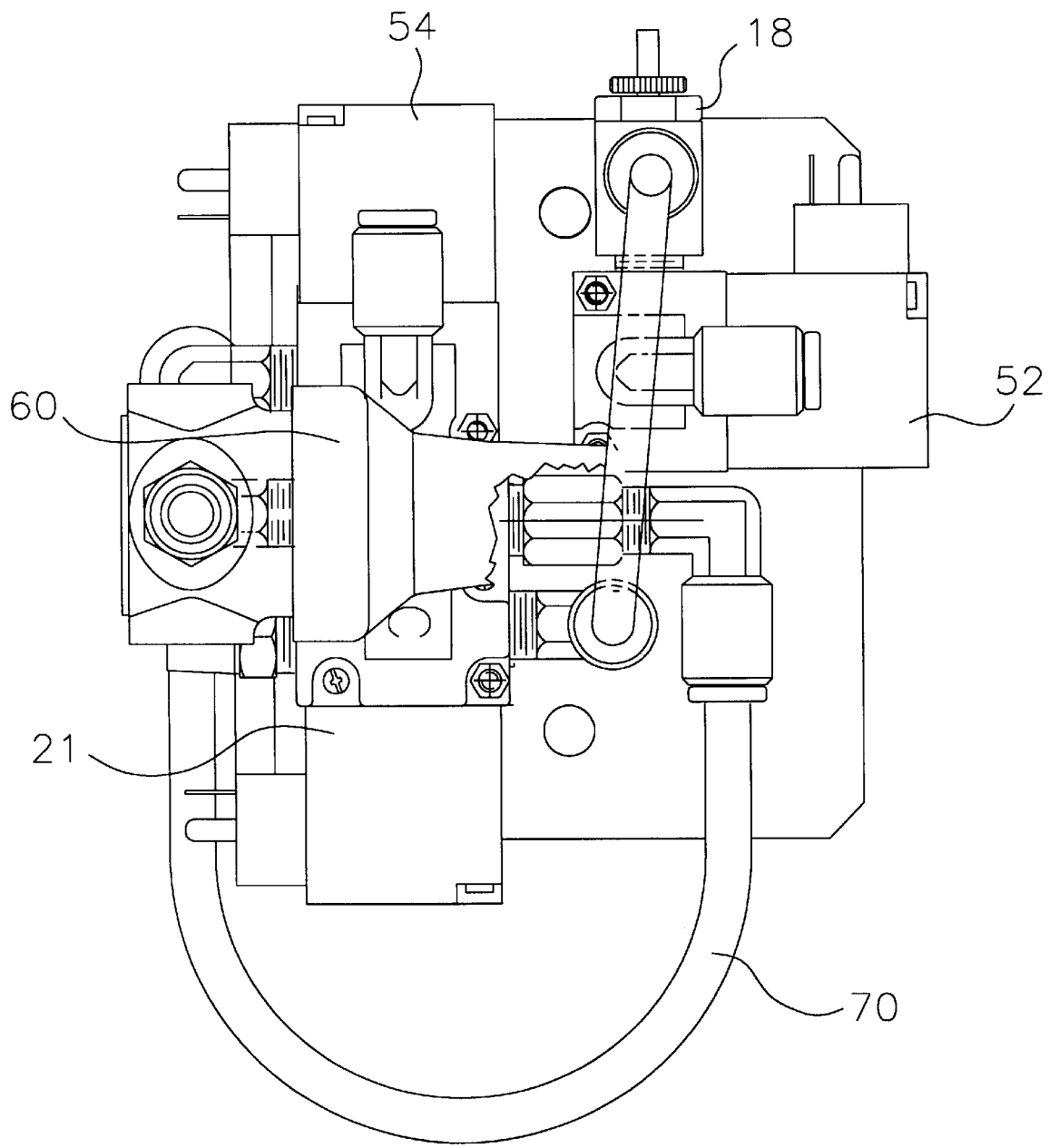
FIG. 3A is a top plan view of an embodiment of a valve system according to the invention.
Figure 3B:
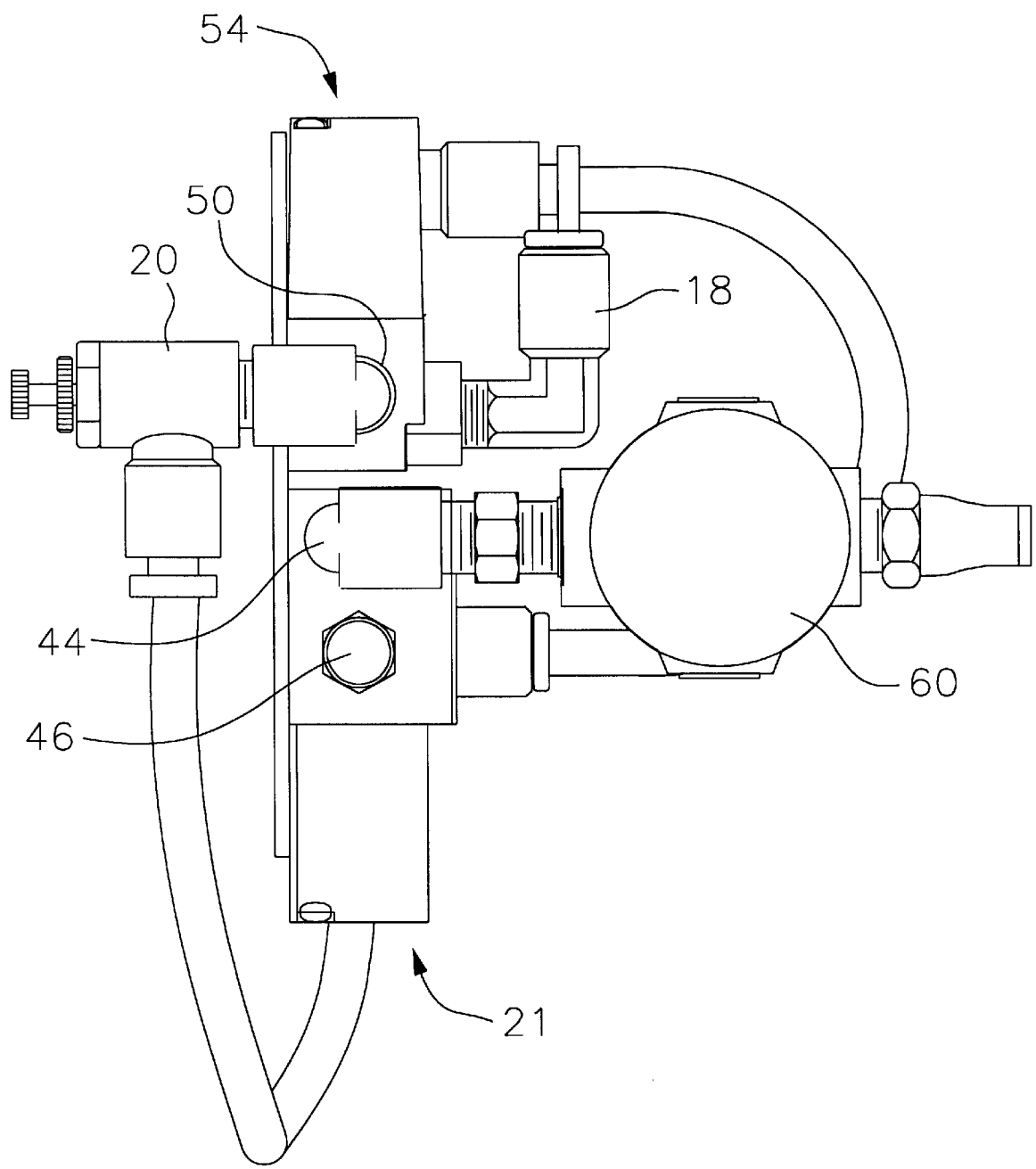
FIG. 3B is a side view of the valve system of FIG. 3A.

FIGS. 3A and 3B illustrate a valve system according to a preferred embodiment of the invention. The switching valve 21 has four ports: an air compressor port 44 for receiving pressurized air from the air compressor, preferably at a pressure between 60 and 100 psi; an exhaust port 46; a port 48 for the down air line 22; and a port 50 for the up air line 24. Pressurized air from the air compressor is set to a relatively high fixed pressure as it passes through regulator 60, preferably a fixed regulator set to about 60 psi, and is routed from the regulator 60 to the air compressor port 44 on the switching valve 21.

To raise and lower the actuating rod 26 in the air cylinder 12, the switching valve is controlled by the operator to switch the air input through the air compressor port 44 and exhausted from the exhaust port 46 between the down air line port 48 and the up air line port 50. On the upstroke (see FIG. 4), the switching valve 21 is switched such that the pressurized air flowing into the air compressor port 44 is directed to the up air line port 50 and the pressurized air exhausted from the air cylinder 12 and through the down air line port 48 is directed to the exhaust port 46. This is the state of the switching valve 21 when the weld head is at rest and is also referred to as the "de-energized" state. During the downstroke (see FIG. 5), pressurized air from the air compressor is routed to the down air line port 48 and exhaust from the up air line port 50 is routed to the exhaust port 46. This state is also referred to as the "energized" state.

The embodiment of the valve system illustrated in FIGS. 3A and 3B also includes a two-way valve 52 and a two-way valve 54 incorporated into the up speed air line 22 and down speed air line 24, respectively. According to alternate embodiments, the two-way valves 52, 54 are positioned either between the flow control valves 18, 20 and the air cylinder 12 or between the flow control valves 18, 20 and the air line ports 48, 50 on the switching valve 21. The operation of these two-way valves according to the presently preferred embodiment is described in detail below.

Figure 6:
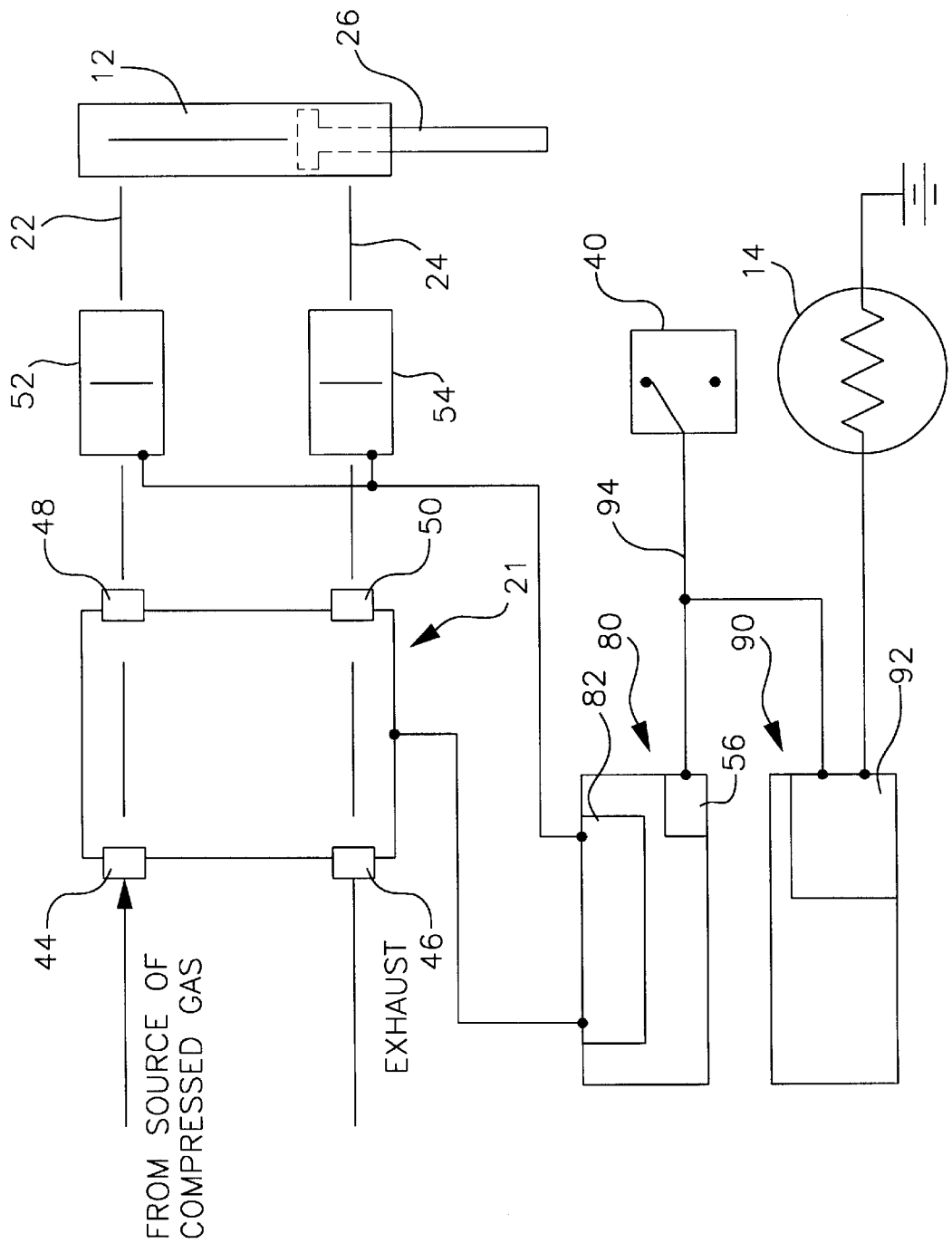
FIG. 6 is a schematic diagram illustrating the flow of pressurized air to the air cylinder during welding.

Referring now to FIG. 6, the valve system, including switching valve 21 and the two-way valves 52, 54, are electrically connected to and controlled by a valve power supply 80 which includes a microcontroller 82 for controlling the states of the various valves. The microcontroller 82 is operator controlled, preferably by a foot pedal (not shown), to switch the routing of pressurized air through the switching valve 21 in order to raise and lower the actuating rod 26 in the air cylinder 12.

Figure 7:
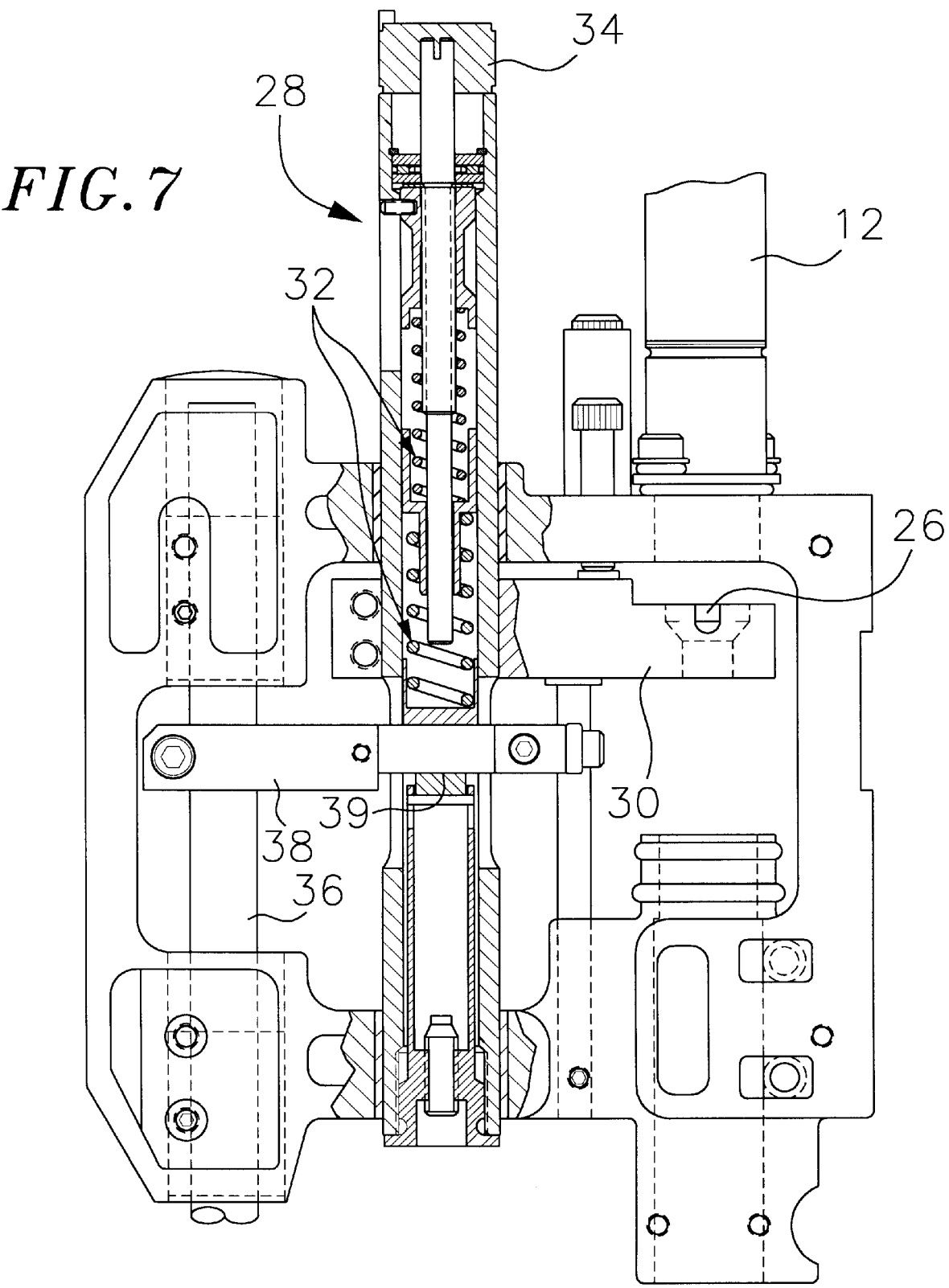
FIG. 7 is a partial cross sectional and partial cutaway view of the weld head shown in FIG. 1, including a cross-sectional view of a spring tube.

As shown in FIG. 7, the air cylinder actuating rod 26 is connected to a spring tube 28 by a spring tube arm 30 such that the spring tube moves up and down with the air cylinder actuating rod 26. The spring tube houses one or more springs 32. The springs 32 may be precompressed to a desired precompression force setting by means of a threaded adjustment knob 34 housed in a threaded bore at the top of the spring tube 28.

The electrode 14 is mounted to an electrode rod 36. The electrode rod 36 is connected to the spring tube 28 by an electrode rod arm 38. The electrode rod arm 38 is positioned in the spring tube 28 directly under the springs 32. When compressed, the springs 32 press the electrode rod arm 38 against a stop 39 positioned below the electrode rod arm 38. The electrode rod arm 38 moves with the spring tube arm 30 during most of the welding operation, but is not rigidly attached to it such that it has some free play. Accordingly, in the welding position, the electrode rod arm 38 can move relative to the spring tube 28 by pressing up on the springs 32 when the downwardly directed precompression force in the springs is overcome by a normal force exerted by the workpiece 16 on the electrode 14.

In operation, the electrode 14 in an up stop position (see FIG. 1) is lowered onto the workpiece 16 by controlling the air cylinder 12 to lower actuating rod 26, which in turn lowers the spring tube 28, and the electrode rod 36 with the electrode 14 onto the workpiece 16. Even after the electrode 14 contacts the workpiece 16, the air cylinder 12 continues to exert downward force on the spring tube 28, thereby causing the electrode 14 to press onto the workpiece 16 with increasingly greater force. During this phase, the workpiece 16 exerts an upward force component on the electrode 14 which approaches the downwardly directed precompression force exerted by the springs 32 in the spring tube 28 on the electrode arm 38. During this phase the spring tube 28 and the electrode rod arm 38 remain essentially stationary. At the point when an upward force component of the force exerted onto the electrode by the workpiece overcomes the precompression force in the springs 32, the springs begins to further compress. During this phase, the spring tube 28 continues descending, while the electrode rod arm 38 remains essentially stationary.

Figure 8:
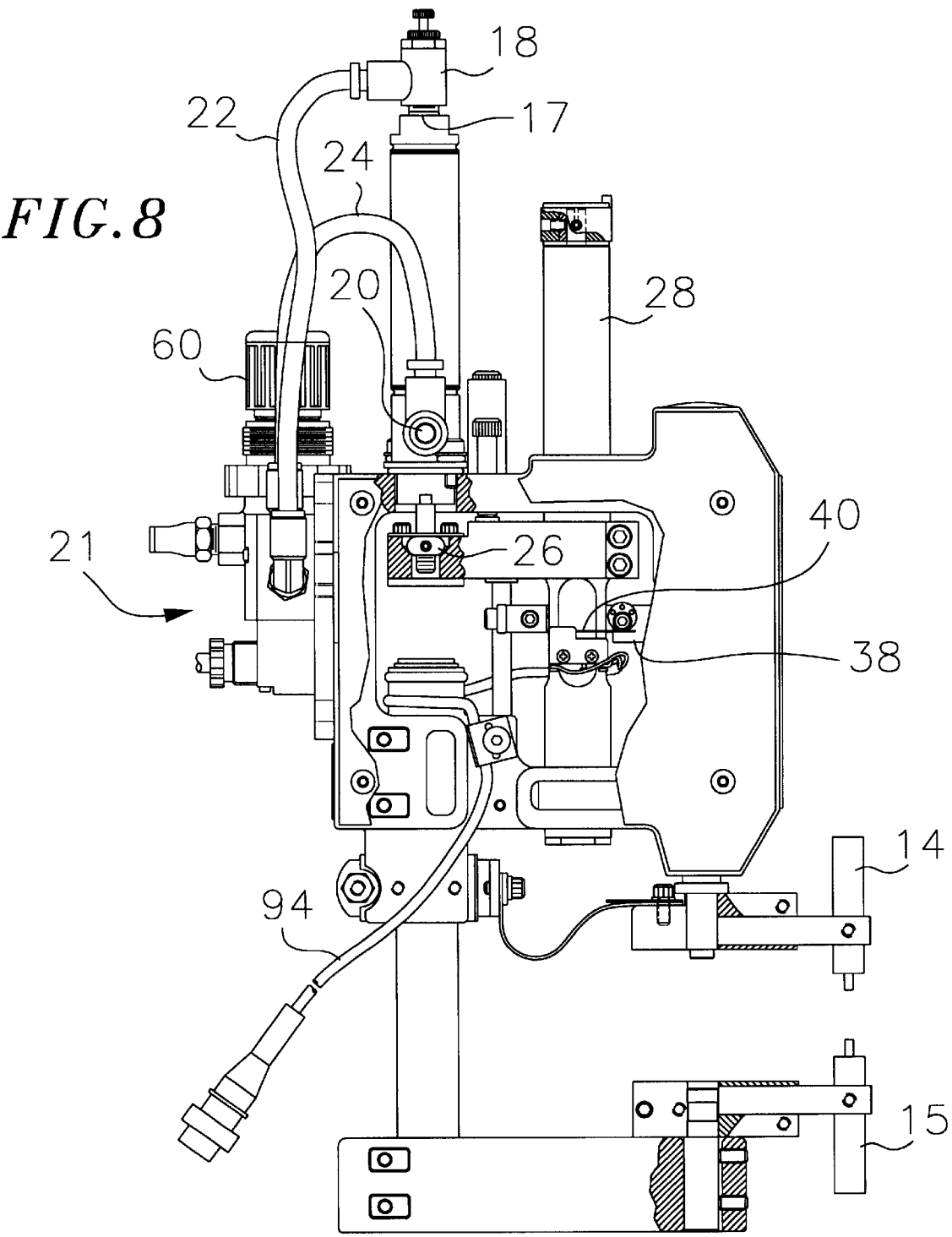
FIG. 8 is a partial cross sectional and partial cutaway view of the weld head shown in FIG. 1, including a view of a force firing switch.

A force firing switch 40, shown in FIG. 8, is mounted on the spring tube 28 and is sensitive to the downward movement of the spring tube 28 with respect to the electrode rod arm 38. The force firing switch 40 activates when the springs 32 compress and the spring tube moves a certain distance with respect to the electrode rod arm 38, typically about 1/16 inch. The springs 32 are set to a precompression force slightly below the desired weld force such that when the desired weld force is attained, the force firing switch 40 activates.

Referring now to FIG. 6, the electrode 14 is electrically connected to and controlled by a welding power supply 90 which includes a microcontroller 92 for controlling the supply of electrical energy to the electrode 14 to initiate welding. The microcontroller 92 is connected to the force firing switch 40 via a cable 94 (FIG. 8) and is sensitive to the state of the force firing switch 40. When activated, the force firing switch 40 signals the welding power supply 90 to supply electrical current to the electrode 14, thereby energizing the electrode 14 to begin welding. The welding power supply microcontroller 92 de-energizes the electrode 14 when the welding is completed. This must be prior to the operator lifting the electrode off of the workpiece to avoid a blown weld. As the upward force exerted by the workpiece 16 on the electrode 14 is reduced, the springs 32 reexpand to their original (precompressed) length. Consequently, the force firing switch 40 deactivates.

To set the desired weld force, the operator precompresses the springs 32 with the spring adjusting knob 34 so that the springs 32 exert a downward force on the electrode rod arm 38 with a force slightly less than the desired weld force. As described above, when the upward component of the force exerted by the workpiece exceeds the downwardly directed spring precompression force exerted on the electrode 14 via the electrode rod arm 38, the springs 32 begin to further compress and the spring tube 28 to move relative to the electrode rod arm 38. The force firing switch 40 activates when the desired weld force is attained between the electrode 14 and the workpiece 16.

When the desired weld force is attained (and the force firing switch activates), it is necessary to maintain a constant force exerted by the air cylinder 12 on the spring tube 28 which is accomplished according to a preferred embodiment of the invention. Referring now to FIG. 6, in a presently preferred embodiment, the valve power supply 80 includes a sensor 56 electrically connected to force firing switch, e.g., by cable 94 (FIG. 8). The sensor is sensitive to the state of the force firing switch 40. The two-way valves 52, 54 are electronically controlled to be in an open or a closed state by the microcontroller 82 in response to the state of the force firing switch 40. As illustrated in the diagram of FIG. 6, when the force firing switch 40 is activated, the microcontroller 82 controls both two-way valves 52, 54 to close. Consequently, the pressure in the both chambers A, B of the air cylinder remains essentially constant, thereby maintaining a constant force exerted by the air cylinder actuating rod 26. With this constant force maintained in the actuating rod 26, the force of the electrode 14 on the workpiece 16 remains constant by way of the electrode rod, the electrode rod arm, and spring tube springs and the spring tube arm. During welding, the spring force in the springs 32 causes the electrode rod arm 38 and associated electrode 14 to move down to compensate for any deformation in the workpiece 16 due to the weld process.

In one embodiment, the valve power supply 80 and the welding power supply 90, and their various components, are incorporated into a single unit. In an alternate embodiment, the valve system, such as that of the embodiment of FIGS. 3A and 3B, and the valve power supply 80 are provided as a kit to replace known switching valves and valve power supplies.

Figure 5:
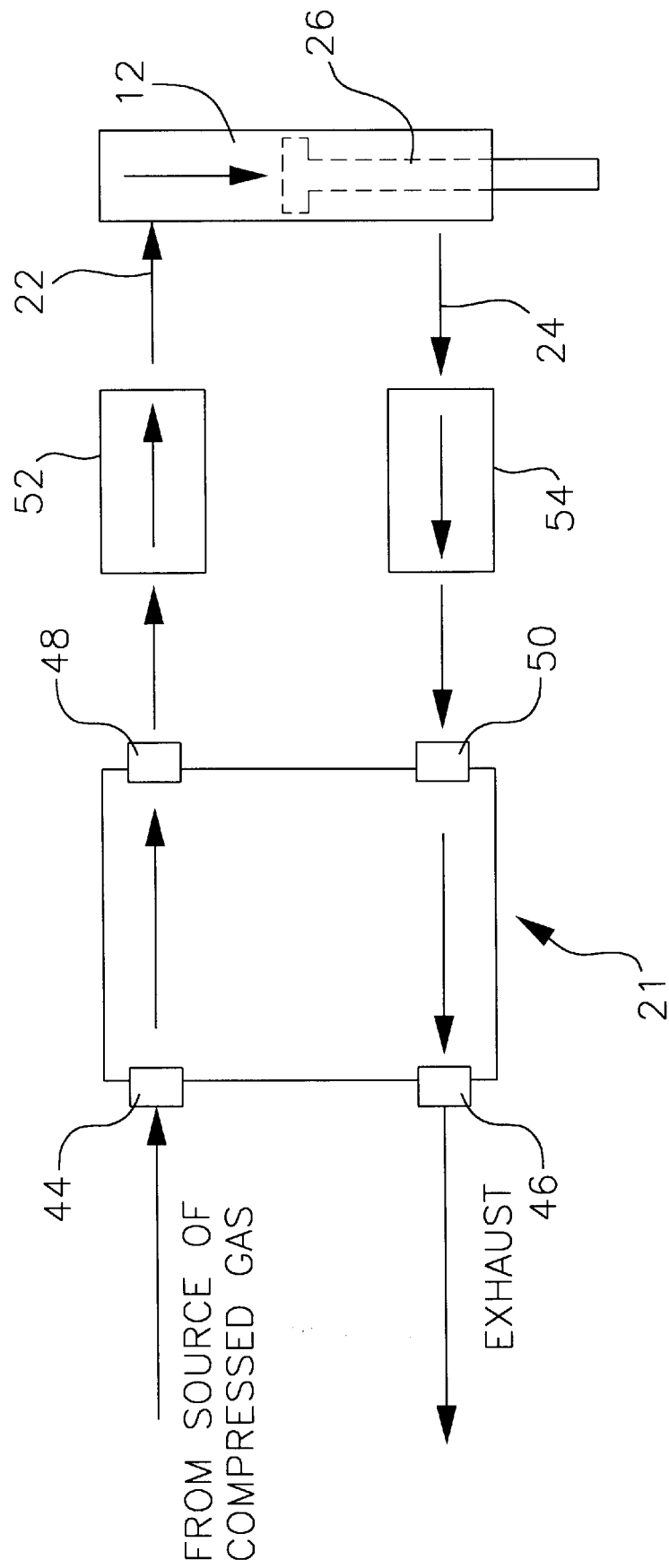
FIG. 5 is a schematic diagram illustrating the flow of pressurized air to the air cylinder during a downstroke of an air cylinder actuating rod.

To operate a weld head according to one embodiment of the invention, the operator first presets the spring tube springs 32 to the desired weld force setting. From the up stop, or de-energized position (see FIG. 1), the operator commands microcontroller 82 to control the switching valve 21 to route compressed air from the air compressor port 44 through the down air line port 48 and exhausted air from the up air line port 50 through the exhaust port 46, as shown in FIG. 5, thereby forcing the actuating rod 26 down, which in turn lowers the electrode 14 onto the workpiece 16. After the electrode 14 contacts the workpiece 16, the air cylinder 12 continues exerting force on the actuating rod 26 and indirectly on the electrode 14 through the spring tube arm 30, spring tube spring 32, electrode rod arm 38, and electrode rod 36. Due to the upward, normal force exerted by the workpiece 16 onto the electrode 14, the electrode rod arm 38 begins to exert upward pressure on the precompressed springs 32. When the force exerted on the springs 32 exceeds the precompression (downward) force stored in the springs 32, the springs begin to further compress. This slight increased compression triggers the force firing switch 40 when the desired weld force is attained. Upon activation of the force firing switch, sensor 56 signals the valve power supply microcontroller 82 to control two-way valves 52, 54 to close, as shown in FIG. 6, thereby maintaining an essentially constant pressure in both chambers A, B of the air cylinder 12, and consequently maintaining the desired weld force between the electrode 14 and the workpiece 16.

When welding is complete, the welding power supply microcontroller 92 de-energized the electrode 14. When the operator de-energizes the valve power supply, e.g., by releasing the foot pedal, the valve power supply microcontroller 82 simultaneously opens the two-way valves 52, 54 and controls the switching valve 21 to route compressed air from the air compressor port 44 through the up air line port 50 and exhausted air from the down air line port 48 through the exhaust port 46 (see FIG. 4), thereby forcing the actuating rod 26 up, which in turn lifts the electrode 14 off of the workpiece 16. The force firing switch 40 deactivates once the desired weld force is lost.

Although the present invention has been described with respect to particular embodiments, those skilled in the art will appreciate that the present invention may be modified without departing from the scope of the invention. For example, the pneumatic cylinder could be replaced by a hydraulic cylinder as the same principles of fluid mechanics utilized by the various embodiments of the invention apply. Also, the microcontroller 82 of the valve power supply 80 of the above described embodiments may be replaced by any type of logic circuit, electronic or otherwise. Accordingly, all such modifications are intended to be included within the scope of the invention as defined by the following claims.

I claim:

1. A weld head for welding a workpiece comprising:

an electrode;

a cylinder comprising an actuating rod operatively connected to the electrode for pressing the electrode onto the workpiece responsive to a flow of pressurized fluid in the cylinder;

a sensor for sensing when the electrode compresses the workpiece with a predetermined weld force;

means for supplying electrical energy to the electrode when the predetermined weld force is sensed; and means, comprising one or more valves having an open and closed position, for maintaining a desired pressure in the cylinder corresponding to the predetermined weld force between the electrode and the workpiece by moving into the closed position and preventing fluid flow into or out of the cylinder when the predetermined weld force is sensed.

2. The weld head of claim 1 wherein the cylinder comprises a first fluid line and a second fluid line, wherein when pressing the electrode onto the workpiece, the first fluid line supplies pressurized fluid to the cylinder at a first rate and the second fluid line exhausts pressurized fluid from the cylinder at a second rate until the desired pressure in the cylinder is attained.

3. The weld head of claim 1 wherein the cylinder is a pneumatic cylinder.

4. The weld head of claim 3 wherein the fluid is air.

5. The weld head of claim 1 wherein the cylinder is a hydraulic cylinder.

6. The weld head of claim 5 wherein the fluid is a hydraulic fluid.

7. A weld head for welding a workpiece comprising:

an electrode;

a cylinder comprising an actuating rod operatively connected to the electrode for pressing the electrode onto the workpiece responsive to a flow of pressurized fluid in the cylinder in a first direction and retracting the electrode from the workpiece responsive to a flow of a pressurized fluid in the cylinder in an opposite direction the cylinder comprising a first fluid line and a second fluid line wherein when pressing the electrode onto the workpiece, the first fluid line supplies pressurized fluid to the cylinder at a first rate and the second fluid line exhausts pressurized fluid from the cylinder at a second rate until the desired pressure in the cylinder is attained;

an electric switch having an open position and a closed position, wherein the switch moves to the closed position when the electrode compresses the workpiece with a predetermined weld force;

means for supplying electrical energy to the electrode when the switch moves to the closed position;

means for maintaining a desired pressure in the cylinder corresponding to the predetermined weld force between the electrode and the workpiece when the switch moves to the closed position;

means for retracting the electrode from the workpiece after a predetermined amount of electrical energy has been supplied to the electrode, the retraction of the electrode causing the switch to move to the open position;

wherein the means for maintaining a desired pressure in the cylinder corresponding to the predetermined weld force comprises a first valve operatively connected to the first fluid line and a second valve operatively connected to the second fluid line, each of the first and second valves having an open state and a closed state; and means for closing both the first valve and the second valve while electrical energy is being supplied to the electrode.

8. The weld head of claim 7 wherein the means for supplying electrical energy to the electrode comprises a welding power supply operatively connected to the electrode, the welding power supply comprising a microcontroller responsive to the movement of the switch to the closed position.

9. The weld head of claim 8 further comprising a switching valve comprising:

an inflow port;

an exhaust port;

a first fluid line port comprising a two-way valve operatively connected to the first fluid line; and a second fluid line port comprising a two-way valve operatively connected to the second fluid line, wherein each of said two-way port valves has an open state and a closed state; and means for switching each of said two-way valves to the closed state when the switch moves to the closed position.

10. The weld head of claim 9 wherein the means for switching each of said two-way valves comprises a valve power supply operatively connected to the electric switch and each of said two-way valves, the valve power supply comprising:

a relay responsive to the movement of the switch to the closed position; and a microcontroller, in electrical circuit relation with the relay, for controlling each of said two-way valves to close when the switch closes.

11. The weld head of claim 7 wherein the means for closing the valves comprises a valve power supply operatively connected to the electrical switch and the first and second valves, the valve power supply comprising:

a relay responsive to the movement of the electrical switch to the closed position; and a microcontroller, in electrical circuit relation with the relay, for causing the first and second valves to close when the switch closes.

12. A method for welding in a welding system comprising a cylinder and a cylinder rod actuated by introducing a pressurized fluid into the cylinder, the method comprising the steps of:

1) moving an electrode onto a workpiece with the actuating rod;

2) pressing the electrode against the workpiece with the actuating rod;

3) sensing when a predetermined weld force between the electrode and the workpiece is reached and simultaneously sealing the pressurized fluid in the cylinder in response thereto;

4) supplying electrical energy to the electrode on the workpiece to produce a weld;

5) maintaining a desired pressure in the cylinder corresponding to the predetermined weld force while the workpiece is being welded;

6) discontinuing the supply of electrical energy to the electrode when the weld is complete; and 7) unsealing the pressurized fluid in the cylinder and retracting the electrode after the weld is complete.

13. The method of claim 12 wherein the cylinder comprises a pneumatic cylinder.

14. The method of claim 13 wherein the fluid is air.

15. The method of claim 12 wherein the cylinder comprises a hydraulic cylinder.

16. The method of claim 15 wherein the fluid is a hydraulic fluid.

17. A pressure regulator system for a weld head comprising a pneumatic cylinder and a weld force switch having an open position and a closed position and which moves to a closed position when a predetermined weld force is attained in the weld head, the pressure regulator system comprising:

a switching valve comprising:
an inflow port;
an exhaust port;
a first line port; and
a second line port;

a first line port valve operatively connected to the first line port and a second line port valve operatively connected to the second line port, wherein each of said port valves is closed in an energized state and open in a de-energized state; and means for substantially simultaneously closing the first line port valve and the second line valve port when the weld force switch moves to the closed position.

18. The pressure regulator system of claim 17 wherein the means for closing the first line port valve and second line port valves comprises a valve power supply for controlling each of said port valves between the open and closed states, the valve power supply comprising:

a valve cutoff switch operatively connected to the weld force switch and responsive to switching of the weld force switch; and a microcontroller in electrical communication with the valve cutoff switch for energizing each of said port valves to close when the weld force switch moves to the closed position and de-energizing the valves after a predetermined interval of time.

19. The pressure regulator system of claim 17 wherein the pressure regulator comprises a kit for inclusion in a weld head.

20. A reflow solder head for reflow soldering a workpiece comprising:

an electrode;

a cylinder comprising an actuating rod operatively connected to the electrode for pressing the electrode onto the workpiece responsive to a flow of pressurized fluid in the cylinder;

a sensor for sensing when the electrode compresses the workpiece with a predetermined reflow solder force;

means for supplying electrical energy to the electrode when the predetermined reflow solder force is sensed;

means, comprising one or more valves having an open and closed position for maintaining a desired pressure in the cylinder corresponding to the predetermined reflow solder force between the electrode and the workpiece by moving into the closed position and preventing fluid flow into or out of the cylinder when the predetermined reflow solder force is sensed.

21. The reflow solder head of claim 20 wherein the cylinder comprises a first fluid line and a second fluid line, wherein when pressing the electrode onto the workpiece, the first fluid line supplies pressurized fluid to the cylinder at a first rate and the second fluid line exhausts pressurized fluid from the cylinder at a second rate until the desired pressure in the cylinder is attained.

22. The reflow solder head of claim 20 wherein the cylinder is a pneumatic cylinder.

23. The reflow solder head of claim 22 wherein the fluid is air.

24. The reflow solder head of claim 20 wherein the cylinder is a hydraulic cylinder.

25. The reflow solder head of claim 24 wherein the fluid is a hydraulic fluid.

26. A reflow solder head for reflow soldering a workpiece comprising:

an electrode:

a cylinder comprising an actuating rod operatively connected to the electrode for pressing the electrode onto the workpiece responsive to a flow of pressurized fluid in the cylinder in a first direction and retracting the electrode from the workpiece responsive to a flow of a pressurized fluid in the cylinder in an opposite direction, the cylinder comprising a first fluid line and a second fluid line, wherein when pressing the electrode onto the workpiece, the first fluid line supplies pressurized fluid to the cylinder at a first rate and the second fluid line exhausts pressurized fluid from the cylinder at a second rate until the desired pressure in the cylinder is attained;

an electric switch having an open position and a closed position, wherein the switch moves to the closed position when the electrode compresses the workpiece with a predetermined reflow solder force;

means for supplying electrical energy to the electrode when the switch moves to the closed position;

means for maintaining a desired pressure in the cylinder corresponding to the predetermined reflow solder force between the electrode and the workpiece when the switch moves to the closed position;

means for retracting the electrode from the workpiece after a predetermined amount of electrical energy has been supplied to the electrode, the retraction of the electrode causing the switch to move to the open position;

wherein the means for maintaining a desired pressure in the cylinder corresponding to the predetermined reflow solder force comprises a first valve operatively connected to the first fluid line and a second valve operatively connected to the second fluid line, each of the first and second valves having an open state and a closed state; and means for closing both the first valve and the second valve while electrical energy is being supplied to the electrode.

27. The reflow solder head of claim 26 wherein the means for supplying electrical energy to the electrode comprises a reflow soldering power supply operatively connected to the electrode, the reflow soldering power supply comprising a microcontroller responsive to the movement of the switch to the closed position.

28. The reflow solder head of claim 27 further comprising a switching valve comprising:
   an inflow port;
   an exhaust port;
   a first fluid line port comprising a two-way valve operatively connected to the first fluid line; and
   a second fluid line port comprising a two-way valve operatively connected to the second fluid line, wherein each of said two-way port valves has an open state and a closed state; and
   means for switching each of said two-way valves to the closed state when the switch moves to the closed position.

29. The reflow solder head of claim 28 wherein the means for switching each of said two-way valves comprises a valve power supply operatively connected to the electric switch and each of said two-way valves, the valve power supply comprising:
   a relay responsive to the movement of the switch to the closed position; and
   a microcontroller, in electrical circuit relation with the relay, for controlling each of said two-way valves to close when the switch closes.

30. The reflow solder head of claim 26 wherein the means for closing the valves comprises a valve power supply operatively connected to the electrical switch and the first and second valves, the valve power supply comprising:
   a relay responsive to the movement of the electrical switch to the closed position; and
   a microcontroller, in electrical circuit relation with the relay, for causing the first and second valves to close when the switch closes.

31. A method for reflow soldering in a reflow soldering system comprising a cylinder and a cylinder rod actuated by introducing a pressurized fluid into the cylinder, the method comprising the steps of:
   1) moving an electrode onto a workpiece with the actuating rod;
   2) pressing the electrode against the workpiece with the actuating rod;
   3) sensing when a predetermined reflow solder force between the electrode and the workpiece is reached and simultaneously sealing the pressurized fluid in the cylinder in response thereto;
   4) supplying electrical energy to the electrode on the workpiece to produce a reflow solder;
   5) maintaining a desired pressure in the cylinder corresponding to the predetermined reflow solder force while the workpiece is being reflow soldered;
   6) discontinuing the supply of electrical energy to the electrode when the reflow solder is complete; and
   7) unsealing the pressurized fluid in the cylinder and retracting the electrode after the reflow solder is complete.

32. The method of claim 31 wherein the cylinder comprises a pneumatic cylinder.

33. The method of claim 32 wherein the fluid is air.

34. The method of claim 31 wherein the cylinder comprises a hydraulic cylinder.

35. The method of claim 34 wherein the fluid is a hydraulic fluid.

36. A pressure regulator system for a reflow solder head comprising a pneumatic cylinder and a reflow solder force switch having an open position and a closed position and which moves to a closed position when a predetermined reflow solder force is attained in the reflow solder head, the pressure regulator system comprising:
   a switching valve comprising:
      an inflow port;
      an exhaust port;
      a first line port; and
      a second line port;
   a first line port valve operatively connected to the first line port and a second line port valve operatively connected to the second line port, wherein each of said port valves is closed in an energized state and open in a de-energized state; and
   means for substantially simultaneously closing the first line port valve and the second line valve port when the reflow solder force switch moves to the closed position.

37. The pressure regulator system of claim 36 wherein the means for closing the first line port valve and second line port valves comprises a valve power supply for controlling each of said port valves between the open and closed states, the valve power supply comprising:
   a valve cutoff switch operatively connected to the reflow solder force switch and responsive to switching of the reflow solder force switch; and
   a microcontroller in electrical communication with the valve cutoff switch for energizing each of said port valves to close when the reflow solder force switch moves to the closed position and de-energizing the valves after a predetermined interval of time.

38. The pressure regulator system of claim 36 wherein the pressure regulator comprises a kit for inclusion in a reflow solder head.

39. A weld head for welding a workpiece comprising:
   an electrode;
   a cylinder comprising an actuating rod operatively connected to the electrode for pressing the electrode onto the workpiece responsive to a flow of pressurized fluid in the cylinder;
   a sensor for sensing when a predetermined weld force between the electrode and workpiece is reached;
   one or more valves responsive to the sensor for blocking fluid flow to and from the cylinder when the predetermined weld force is reached and maintaining the predetermined weld force.

40. The weld head of claim 39 wherein the sensor comprises an electric switch.

41. The weld head of claim 39 further comprising a controller coupled to the sensor for causing the valve to close when the sensor senses the predetermined weld force.

42. The weld head of claim 39 wherein the means for maintaining the desired pressure in the cylinder comprises:
   a first valve operatively connected to a first fluid line and a second valve operatively connected to a second fluid line, each of the first and second valves having an open state and a closed state; and
   means for closing both the first valve and the second valve while electrical energy is being supplied to the electrode.

43. The weld head of claim 42 wherein the means for closing the valves comprises a valve power supply operatively connected to the electrical switch and the first and second valves, the valve power supply comprising:

a relay responsive to the sensor; and a microcontroller, in electrical circuit relation with the relay, for causing the first and second valves to close in response to the sensor.

44. A reflow soldering head for reflow soldering a workpiece comprising:

an electrode;

a cylinder comprising an actuating rod operatively connected to the electrode for pressing the electrode onto the workpiece responsive to a flow of pressurized fluid in the cylinder;

a sensor for sensing when a predetermined reflow soldering force between the electrode and workpiece is reached;

one or more valves responsive to the sensor for blocking fluid flow to and from the cylinder when the predetermined reflow soldering force is reached and maintaining the predetermined reflow soldering force.

45. The reflow soldering head of claim 44 wherein the sensor comprises an electric switch.

46. The reflow soldering head of claim 44 further comprising a controller coupled to the sensor for causing the valve to close when the sensor senses the predetermined reflow soldering force.

47. The reflow soldering head of claim 44 wherein the means for maintaining the desired pressure in the cylinder comprises:

a first valve operatively connected to a first fluid line and a second valve operatively connected to a second fluid line, each of the first and second valves having an open state and a closed state; and means for closing both the first valve and the second valve while electrical energy is being supplied to the electrode.

48. The reflow soldering head of claim 44 wherein the means for closing the valves comprises a valve power supply operatively connected to the electrical switch and the first and second valves, the valve power supply comprising:

a relay responsive to the sensor; and a microcontroller, in electrical circuit relation with the relay, for causing the first and second valves to close in response to the sensor.

* * * * *